July 20, 1954 H. F. REICHENBACH 2,683,899
MOLD FOR TUBULAR PLASTIC PARTS
Filed March 15, 1951 2 Sheets-Sheet 1

INVENTOR.
HOWARD F. REICHENBACH
BY
H. G. Manning
ATTORNEY.

July 20, 1954  H. F. REICHENBACH  2,683,899
MOLD FOR TUBULAR PLASTIC PARTS
Filed March 15, 1951  2 Sheets-Sheet 2

INVENTOR.
HOWARD F. REICHENBACH
BY
H. G. Manning
ATTORNEY.

Patented July 20, 1954

2,683,899

UNITED STATES PATENT OFFICE 2,683,899

MOLD FOR TUBULAR PLASTIC PARTS

Howard F. Reichenbach, Waterbury, Conn., assignor of one-half to Cresale Incorporated, Waterbury, Conn., a corporation of Connecticut Application March 15, 1951, Serial No. 215,688

2 Claims. (Cl. 18—42)

This invention relates to molds for the manufacture of plastic articles and is more particularly directed to molds for accurately forming integral inner sleeve and base units of the kind employed in swivel or elevator type tubular cosmetic applicators.

In the mass production of small thin-walled tubular articles of plastic by the injection molding process, it has been found difficult to accurately control the wall thickness due to the fact that the plastic material injected into the mold at great pressure often had a tendency to build up more rapidly at one side within the mold than at the other, which resulted in a slight displacement of the mold core and consequent irregularity in the shell wall thickness of the parts molded. Since it is necessary that the sleeve thickness be uniform for smooth operation of the assembled cosmetic applicator, as will more clearly be apparent from the following description, the use of ordinary molds constructed in accordance with previously known techniques resulted in a high rejection percentage and consequent waste due to unusable parts.

Accordingly, one object of the present invention is to furnish a mold for the manufacture of plastic parts of the character described which incorporates means for maintaining the mold core in axial alignment even while under the stress of unequal forces occurring during the high-pressure plastic injection operation.

Another object of the present invention is to provide a mold for the manufacturing of headed tubular plastic parts having uniform wall-thickness and concentricity within close tolerances.

In the manufacture of cosmetic or lipstick applicators of the character described, it is often desirable for commercial reasons to change the shape or style of the visible base or head of the integral inner sleeve and base unit, without necessarily changing the concealed inner sleeve or tubular portion. Since the usual expedient of making an entirely new mold just to change the shape of a small portion of a molded article is a very costly procedure, it is accordingly another object of the present invention to provide a mold having changeable head-forming portions, whereby parts differing only in head shape may be manufactured by the use of a single basic mold at a small fraction of the cost of entirely different molds.

A further object is to provide a mold of the above nature which will be simple in construction, inexpensive to manufacture, easy to install and manipulate, and very efficient and durable in use.

With these and other objects in view, there has been illustrated on the accompanying drawings one form in which the invention may conveniently be embodied in practice.

Figure 1:
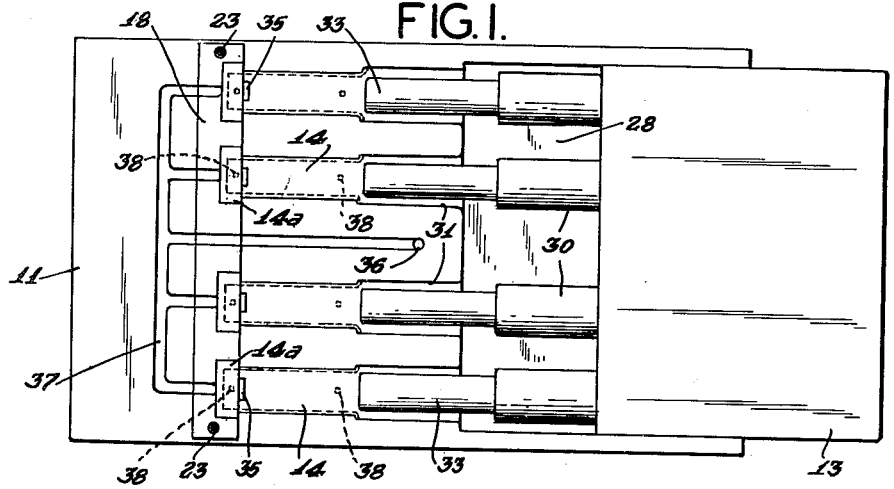
Fig. 1 represents an inside view of the bottom half of the mold taken along the parting line 1—1 of Fig. 3 looking in the direction of the arrows, the core plug being shown withdrawn to the right.
Figure 2:
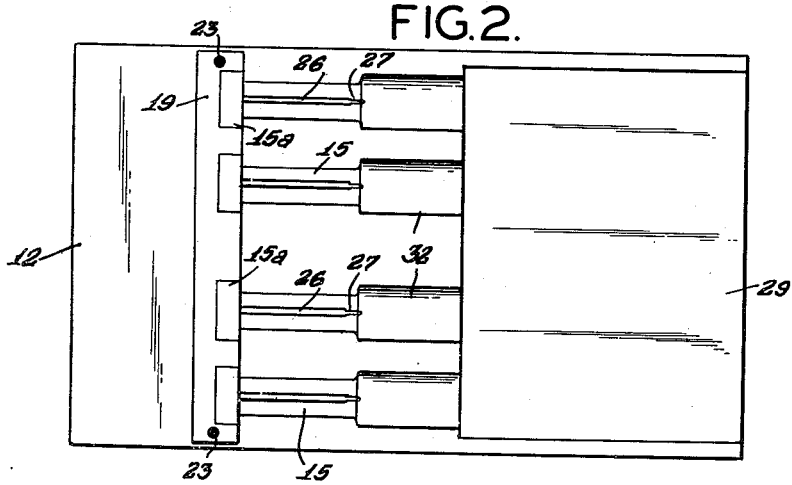
Fig. 2 is an inside view of the top half of the mold taken along the parting line 2—2 of Fig. 3, the core plug not being shown in this view.

Referring now to the drawings, in which like reference numerals denote corresponding parts throughout the several views, the numeral 10 (Fig. 3), indicates generally the mold embodying the invention, the same comprising a lower die body 11, a complementary upper die body 12, and a removable core plug 13. Fig. 1 shows the inner side of the lower die body 11 together with the partially withdrawn core plug 13 separated from the upper die body 12.

Figure 4:
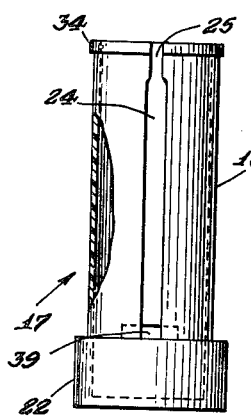
Fig. 4 is a front elevational view of a plastic cosmetic applicator part formed by the mold.
Figure 5:
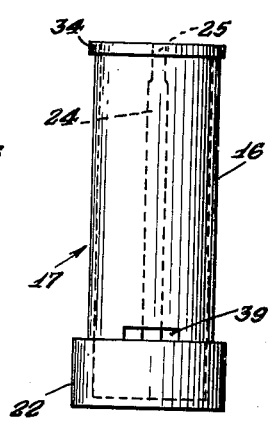
Fig. 5 is a rear elevational view of the same.

It will be evident that though the particular mold herein disclosed is designed to form four of the tubular plastic parts shown in Figs. 4 and 5, during a single cycle of operation, the invention is equally applicable to molds for forming any other number of tubular articles at once.

The lower and upper die bodies 11, 12 are provided with a plurality of aligned identical semi-cylindrical concavities 14, 15 respectively, for forming the outer wall 16 of the tubular parts 17. A pair of complementary head-forming blocks 18, 19 are closely embraced within the elongated rectangular openings 20, 21 of the lower and upper die bodies 11, 12 respectively, said head blocks having therein complementary semi-cylindrical identical concavities 14a, 15a of greater diameter than the concavities 14, 15 and aligned therewith respectively for forming a cylindrical head 22 on each of the parts 17. The head forming blocks 18, 19 are secured within their respective die bodies by counter-sunk machine screws 23, whereby said blocks may readily be removed for replacement by other head-forming blocks (not shown) for manufacturing plastic parts of different head size or shape by the use of the same basic mold.

The plastic part 17 is provided with a longitudinal slot 24 having a reduced end opening or neck 25, for the formation of which there is provided in each of the concavities 15 of the upper die body 12, a centrally disposed longitudinal shoulder rib 26 having an end portion 27 of reduced width.

The lower and upper die bodies 11, 12 are provided with complementary rectangular guide channel concavities 28, 29 respectively, for slidably embracing the body of the core plug 13.

The core plug 13 is provided with four guide pins 30, so positioned as to be slidably received within the respective cylindrical guide channels formed by complementary pairs of semi-cylindrical concavities 31, 32 in the die blocks.

Each of the guide pins 30 is provided with a coaxial cylindrical outwardly-extending plug portion or core 33, of lesser diameter than that of the semi-cylindrical concavities 14, 15, whereby when the core plug 13 is closed into the mold for a molding operation, as represented by the dotted line position thereof in Fig. 1, hollow plastic parts will be formed thereby.

It is to be noted that the semi-cylindrical concavities 31, 32 are coaxial with and of slightly greater diameter than the respective semi-cylindrical concavities 14, 15 of the mold bodies, and that when the core plug is at its innermost or molding position the outer ends of the guide pins 30 do not quite reach the ends of the complementary respective concavities 14, 15, whereby a peripheral shoulder 34 will be formed on the molded tubular parts 17 (see Figs. 4 and 5).

In order to hold the plug portions or cores 33 securely against bending due to forces incidental to the plastic injection operation, each of the semi-cylindrical concavities 14 is provided at its inner end with a central upstanding positioning lug 35, concavely hollowed at its upper end so as to slidably embrace the inner end of said plug portions 33. It will be thus clearly evident that the combined restraining action of the longitudinal shoulder ribs 26 and the lugs 35, acting against opposite sides of the plug portions 33, will effectively counteract any tendency toward axial displacement of said plug portions.

The improved mold is further provided in its lower die body with the usual plastic injection orifice 36, and the concave injection flow channels 37 having portions communicating with each of the molding cells.

Operation of the mold

Figure 3:
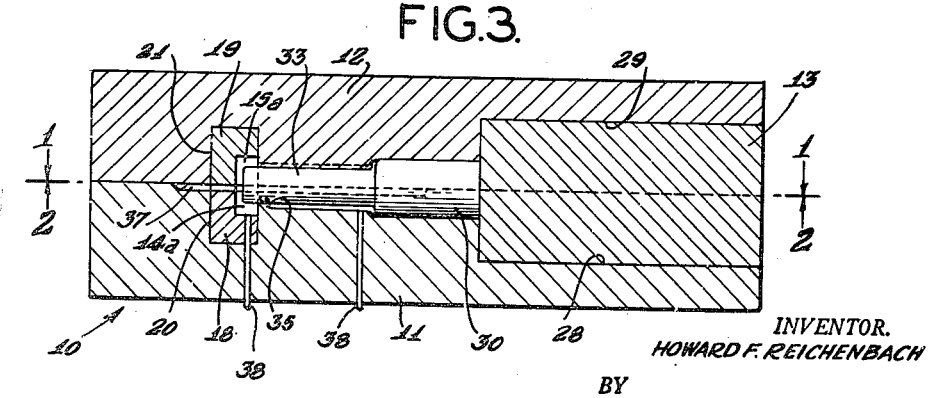
Fig. 3 is a vertical cross-sectional view of the closed mold with the core plug shown in closed position ready for injection of the plastic material.

In a molding operation, the die body members 11, 12 will be held together and the core plug 13 will be moved into closed position in the mold 10 as shown in Fig. 3, after which the fluid plastic material will be injected through the orifice 36 and channel 37 into the forming cells, at suitable temperature and pressure conditions well known in the art.

As hereinabove detailed, the plug portions or cores 33 will be held rigidly in axial alignment, whereby a concentric plastic shell will be formed. After the plastic has set, the mold will be parted and the core plug 13 withdrawn, whereupon the usual ejector pins 38, extending through the lower die body 11 and opening flush into the molding cells at opposite ends thereof, will be struck at their outer ends to dislodge the formed plastic parts. It will be noted that the presence of the positioning lug 35 in the mold cells will leave a small rectangular opening 39 in the outer wall 16 near the cylindrical head 22 of the formed parts 17.

Figure 6:
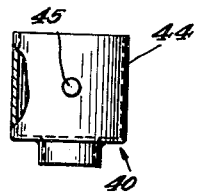
Fig. 6 is an elevational view of the cosmetic carrier of the lipstick applicator.
Figure 7:
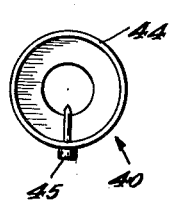
Fig. 7 is a top view of the same.
Figure 8:
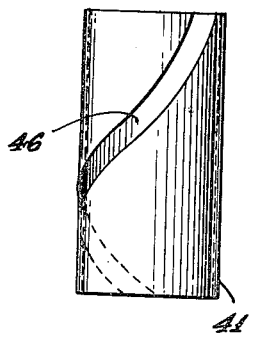
Fig. 8 is an elevational view of the helically grooved propelling sleeve of the lipstick applicator.
Figure 9:
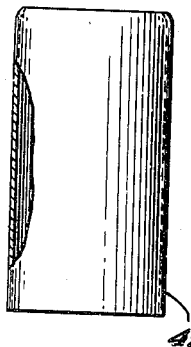
Fig. 9 is an elevational view of the outer sleeve of same.
Figure 11:
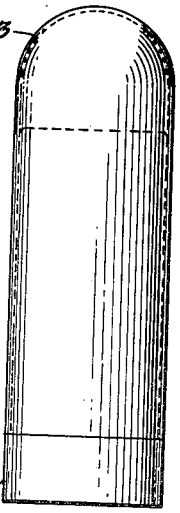
Fig. 11 is an elevational view of the cap or cover as it appears when fitted on the applicator.

The lipstick applicator embodying the tubular part or inner sleeve 17 formed by the mold further comprises a lipstick carrier 40 (Figs. 6 and 7), a propelling sleeve 41 (Fig. 8), an outer sleeve 42 (Fig. 9), and a hemispherically domed cap member or cover 43 (Fig. 11).

The carrier 40 which is preferably struck from sheet metal, is cup shaped, and has a cylindrical wall 44 of such a diameter as to slidably fit within the inner sleeve 17. The wall 44 of the carrier 40 is provided with an aperture within which is force-fitted a headed pin 45 extending laterally therethrough, said headed pin serving both to anchor the lipstick and guide the carrier vertically within the slot 24 of the inner sleeve 17.

The propelling sleeve 41, also preferably formed of sheet metal, rotatably embraces the outer wall 16 of the inner sleeve 17, and is provided with a helical slot 46 within which the head of the pin 45 is disposed in the assembled applicator.

The outer sleeve 42 frictionally embraces the propelling sleeve 41 and serves to hold the same rotatably disposed on the inner sleeve 17 between the facing undersides of the head 22 and the shoulder 34.

Figure 10:
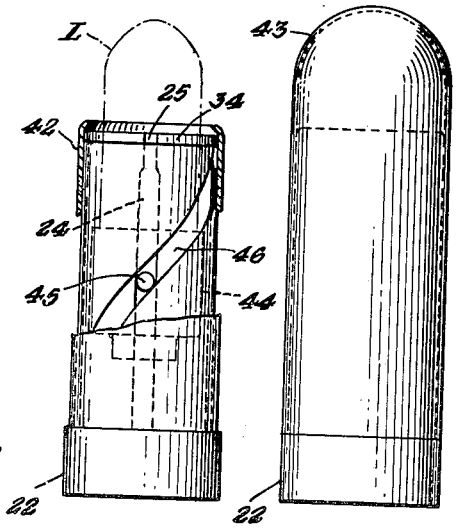
Fig. 10 is an assembly view in elevation of the lipstick applicator.

Fig. 10 illustrates an assembly view of the applicator in which a lipstick L is shown in dashed lines. The cap member 43 is provided to cover the lipstick when the applicator is not in use, as illustrated in Fig. 11. The applicator is operated by merely removing the cap 43 and then turning the head 22 with respect to the outer sleeve 42, whereupon the helical slot 46 on the propelling sleeve 41 will be rotated with respect to the longitudinal slot 24 to urge the headed pin 45, the carrier 40, and the lipstick L inwardly or outwardly depending upon the direction in which the head is turned.

It is to be noted that since the head of the pin 45 must be long enough to be engaged by the thin edges of the helical slot 46 and the propelling sleeve 41, and since the outer end of said head must at the same time be short enough so as not to rub against the inner surface of the outer sleeve 42, it is required that the concentricity of the tubular wall surfaces be very accurately maintained. The improved mold herein disclosed and embodying the invention has been found to be exceptionally well suited to meet this requirement.

One advantage of the improved mold is that it makes possible the mass production of accurately molded tubular parts with a minimum rejection ratio and consequent lower inspection costs.

Another advantage of the improved mold resides in the fact that plastic articles having portions of different shape may be manufactured by use of the same basic mold.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a die set for molding a tubular plastic article, the combination comprising a lower die body, an upper die body, both of which are open at one end, said die bodies having aligned complementary elongated substantially semi-cylindrical concavities for shaping the outer wall of a tubular article to be molded when said die bodies are in face-to-face relation, a cylindrical overhung core member coaxially slidable into the open end of said die set between said concavities, and rigidly secured at its outer end to a core plug, an elongated rib on one of said die bodies projecting inwardly into engagement with said slidable core member, and a short lug on the other die body located diametrically opposite said rib for engaging the inner end of said core member when the latter is in its innermost position and a head-forming block spaced from said core member when in its innermost position whereby the walls of said tubular plastic article will be exactly concentric and uniform in thickness.

2. The invention as defined in claim 1, in which said head-forming block comprises a pair of removable complementary sections having aligned cavities to form the head of said tubular plastic article, said block sections being closely embraced within positioning cavities at the inner ends of their respective die bodies.

References Cited in the file of this patent

UNITED STATES PATENTS

| Number | Name | Date |
|---|---|---|
| 1,692,340 | Lattin | Nov. 20, 1928 |
| 1,787,503 | Zube | Jan. 6, 1931 |
| 2,181,558 | Beckman | Nov. 28, 1939 |
| 2,296,016 | Bostwick | Sept. 15, 1942 |
| 2,351,395 | Broder | June 13, 1944 |
| 2,523,457 | Thompson et al. | Sept. 26, 1950 |